(12) United States Patent
Kurki

(10) Patent No.: US 12,448,731 B2
(45) Date of Patent: Oct. 21, 2025

(54) COOKING METHOD

(71) Applicant: AMPPC Finland Oy, Lappeenranta (FI)

(72) Inventor: Matti Kurki, Lappeenranta (FI)

(73) Assignee: AMPPC Finland Oy, Lappeenranta (FI)

( * ) Notice: Subject to any disclaimer, the term of this patent is extended or adjusted under 35 U.S.C. 154(b) by 512 days.

(21) Appl. No.: 18/004,206

(22) PCT Filed: Jun. 23, 2021

(86) PCT No.: PCT/FI2021/050480
§ 371 (c)(1),
(2) Date: Jan. 4, 2023

(87) PCT Pub. No.: WO2022/008790
PCT Pub. Date: Jan. 13, 2022

(65) Prior Publication Data
US 2023/0265612 A1    Aug. 24, 2023

(30) Foreign Application Priority Data

Jul. 6, 2020 (FI) .................................... 20205724

(51) Int. Cl.
| | | |
|---|---|---|
| *D21C 11/00* | (2006.01) | |
| *D21C 1/02* | (2006.01) | |
| *D21C 3/02* | (2006.01) | |
| *D21C 3/06* | (2006.01) | |
| *D21C 9/00* | (2006.01) | |
| *D21C 9/18* | (2006.01) | |

(52) U.S. Cl.
CPC ............ *D21C 11/0007* (2013.01); *D21C 1/02* (2013.01); *D21C 3/02* (2013.01); *D21C 3/06* (2013.01); *D21C 9/007* (2013.01); *D21C 9/18* (2013.01)

(58) Field of Classification Search
CPC ........ D21C 11/0007; D21C 1/02; D21C 3/02; D21C 3/06; D21C 9/007; D21C 9/18; D21C 3/04; D21C 1/00; D21C 3/00; Y02E 50/10; D21B 1/00
See application file for complete search history.

(56) References Cited

U.S. PATENT DOCUMENTS

| | | |
|---|---|---|
| 2,355,091 A | 8/1944 | Mcdonald |
| 4,486,267 A | 12/1984 | Prusas |
| | (Continued) | |

FOREIGN PATENT DOCUMENTS

| | | |
|---|---|---|
| AU | 2010202496 B2 | 4/2015 |
| CA | 2786949 A1 | 8/2011 |
| | (Continued) | |

OTHER PUBLICATIONS

Chile Patent Office, Office Action, Application No. 202203836, Mailed Aug. 19, 2024, 3 pages.
(Continued)

*Primary Examiner* — Abbas Rashid
*Assistant Examiner* — Elisa H Vera
(74) *Attorney, Agent, or Firm* — Ziegler IP Law Group, LLC

(57) ABSTRACT

A cooking method wherein partly digested wood based cellulosic raw material is compressed during cooking to provide high molecular weight xylan, lignin and pulp.

16 Claims, 4 Drawing Sheets

(56) References Cited

U.S. PATENT DOCUMENTS

| | | | |
|---|---|---|---|
| 4,552,616 A | 11/1985 | Kauppi | |
| 5,736,006 A | 4/1998 | Prough | |
| 6,214,164 B1 | 4/2001 | Rantala | |
| 2005/0203291 A1 | 9/2005 | Svenson et al. | |
| 2009/0312536 A1 | 12/2009 | Sixta et al. | |
| 2014/0011258 A1* | 1/2014 | Medoff | C12P 7/48 |
| | | | 435/209 |
| 2019/0292725 A1* | 9/2019 | Kurki | D21C 11/0007 |

FOREIGN PATENT DOCUMENTS

| | | |
|---|---|---|
| CN | 104379833 A | 2/2015 |
| CN | 109196164 A | 1/2019 |
| DE | 2628971 A1 | 1/1978 |
| EP | 0442806 A1 | 8/1991 |
| ES | 2310723 T3 | 1/2009 |
| JP | 2014147313 A | 8/2014 |
| WO | 9520065 A1 | 7/1995 |
| WO | 9947733 A1 | 9/1999 |
| WO | 0052256 A1 | 9/2000 |
| WO | 0242551 A1 | 5/2002 |
| WO | 2011138633 A1 | 11/2011 |
| WO | 2011138634 A1 | 11/2011 |
| WO | 2012007642 A1 | 1/2012 |
| WO | 2012128901 A1 | 9/2012 |
| WO | 2012158075 A1 | 11/2012 |
| WO | 2016080895 A1 | 5/2016 |
| WO | 2017203329 A1 | 11/2017 |

OTHER PUBLICATIONS

Notification of Transmittal of International Search Report and Written Opinion of the International Searching Authority; European Patent Office; PCT/FI2021/050480; Mailed Sep. 29, 2021; 15 pages.

Notification of Transmittal of the International Preliminary Report on Patentability; European Patent Office; PCT/FI2021/050480; mailed Sep. 27, 2022; 18 Pages.

Search Report; Finnish Patent and Registration Office; Patent Application No. 20205724; dated Feb. 4, 2021; 2 pages.

INAPI, Expert Response, Application No. 202203836, Mailed Feb. 20, 2025, 11 pages.

China Patent Office, Office Action pertaining to 202180047853.9, Dated Mar. 15, 2024, 10 Pages.

* cited by examiner

COOKING METHOD

FIELD

The present disclosure relates to a cooking method for combined production of high yield and high molecular weight (HMW) xylan, HMW lignin, sulfite and dissolving pulp from a cellulosic fiber source, and to a digester system where the cooking method can be used. The pulp produced according to the method is useful for manufacturing paper grade pulp, dissolving cellulose products and derivatives of cellulose.

BACKGROUND

Pulp, also known as paper pulps or dissolving cellulose, is a bleached wood pulp that has a high cellulose content and is produced chemically from the wood by using a soda process or a kraft process. The Kraft and soda processes are a commonly used pulping process and in a conventional Kraft process, wood is treated with an aqueous mixture of sodium hydroxide and sodium sulfide. In the soda process the wood is processed with sodium hydroxide. This treatment degrades and solubilizes lignin leading to a defibration of the wood fibers.

Generally wood pulp containing high levels of alpha cellulose is known in the art as dissolving pulp, and it is used to manufacture cellulose derivatives and products for various uses. Other terms synonymous with dissolving pulp are chemical cellulose and special high alpha pulp. Two processes are in general used for the manufacture of dissolving pulp viz:
1) The acid sulphite process, the development of which started at about the beginning of this century (Rydholm, S. A., Pulping Processes, p. 280, Interscience Publishers, New York-London-Sydney 1965); and
2) The prehydrolysis—Kraft process, the development of which started in 1929 (Rydholm referred to above—p 281).

The latter process makes use of an acidic pretreatment ("pre-hydrolysis") step in order to remove hemicellulose prior to the alkaline pulping (delignification) step. South African Patent 88/4037 discloses the pre-hydrolysis—neutral sulphite—anthraquinone process (PH-NS-AO) for the manufacture of "hemicellulose hydrolysate and special pulp" (high alpha grade). This pre-hydrolysis step performs essentially the same function as the pre-hydrolysis step prior to the Kraft (Sulphate) pulping method for the manufacture of dissolving grade pulp; while the neutral sulphite-anthraquinone delignification step is essentially the same as the process also known as the semi-alkaline sulphite-anthraquinone (SAS-AQ) process, first reported at a technical conference in 1979 by Raubenheimer, S and Eggers, S. H., (both being research workers employed by SAPPI LIMITED, the present applicant herein) viz the 11th European ESPRA Meeting, Maastricht, The Netherlands, during May 1979.

Furthermore, conventional manufacturing of paper and dissolving pulps by kraft processes or soda processes that comprise a pre-hydrolysis step suffer from low yields as the hemicelluloses and cellulose in the wood are degraded during the process, mainly in the pre-hydrolysis step, and are transferred into an acid condensate as low-molecular weight hemicellulose, monosaccharides and hemicellulose degradation products. The soda processes suffer from low yields as the hemicelluloses and celluloses in the wood are degraded during the cooking process due to very long cooking times. Due to difficulties in extracting these degradation products from the digester, the degraded material is at best used for energy production by evaporation and burning of the components or else simply discarded as waste.

WO 99/47733 discloses a process for producing cellulosic fibers, wherein the degree of polymerization of the obtained fibers can be adjusted via acid hydrolytic and oxidative degradation. However, the kraft pulp obtained by this process has high amounts of residual hemicelluloses, which makes the obtained pulp less useful for the production of regenerated cellulose for use in e.g. textile applications as these residual compounds have a negative impact on the process behavior and, as a result thereof, also on the textile-mechanical properties of the fibers produced therefrom.

US 2009/0312536 discloses a process for producing dissolving pulp suitable for textile applications from a cellulosic starting material using a kraft process which has been combined with a purification step of cold caustic extraction (CCE) type.

Both WO2011/138633 and WO2011/138634 disclose methods for pulp processing including a cold caustic extraction step. However, the disclosed methods describe costly procedures having a low total yield of dissolving pulp.

Accordingly, the aspects of the disclosed embodiments are directed to provide an improved industrial scale cooking process for producing high yield dissolving pulp with low hemicellulose content and which can be easily delignified and bleached to required brightness and viscosity level.

to the aspects of the disclosed embodiments are also directed to provide a cooking system for wood-based cellulosic raw material which provides pulp, high molecular weight xylan and high molecular weight lignin without sulfur compounds.

SUMMARY

At least some of the above aspects and other aspects may be obtained by the embodiments as defined in the independent claims. The aspects of the disclosed embodiments are advantageous in that it makes possible to generate value-added products, such as HMW hemicellulose, HMW xylan and HMW lignin, from lignocellulosic raw material used in pulping. Further, the aspects of the disclosed embodiments use less energy in production of dissolving pulp or paper grade pulp than conventional pulping processes.

The aspects of the disclosed embodiments also allows decreasing processing time and/or cooking time. A further advantage is that the total yield of paper and dissolving pulp is higher in the present process than what can be achieved using conventional pre-hydrolysis-soda, pre-hydrolysis-kraft or sulfite process when producing paper or dissolving grade pulps. The embodiments described in the following provide further advantages.

According to a first aspect is provided cooking method comprising:
a) providing wood based cellulosic raw material comprising chips, pin chips, shavings, saw dust, or a combination thereof;
b) pre-treating the wood based cellulosic raw material by steaming to provide pre-treated material;
c) optionally pre-hydrolyzing the pre-treated material with steam or water to provide pre-hydrolyzed material;
d) optionally grinding and compressing the pre-treated material and/or the pre-hydrolyzed material to release HMW xylan from the pre-treated and/or pre-hydrolyzed material into a hydrolysate, and recovering the hydrolysate containing HMW xylan;

e) neutralizing with sodium hydroxide with sulphur or with sodium hydroxide, or displacing with an organic acid selected from lactic acid, acetic acid, formic acid, citric acid, oxalic acid, uric acid and malic acid;

f) cooking in a cooking liquor comprising sodium hydroxide with sulphur or sodium hydroxide, or an organic acid selected from lactic acid, acetic acid, formic acid, citric acid, oxalic acid, uric acid and malic acid, to provide cooked cellulosic material in a spent liquor;

g) grinding and compressing the cooked cellulosic material to release HMW lignin from the cooked material into the spent liquor, thereby providing a HMW lignin fraction in black liquor and a compressed cellulose fraction.

h) displacing the spent cooking liquor with a displacing liquor containing 1-40 effective alkali as NaOH or acidic sulfite cooking liquor, or displacing with an organic acid selected from lactic acid, acetic acid, formic acid, citric acid, oxalic acid, uric acid and malic acid;

i) recovering the HMW lignin from the HMW lignin fraction in black liquor and from the displacing liquor; and j) recovering dissolving pulp from the compressed cellulose fraction.

The present cooking method is advantageous in being able to provide a combined production of HMW hemicellulose, HMW xylan, HMW lignin, and dissolving pulp. In particular HMW xylan can be produced in the present method by opening the fiber cell wall structure by prehydrolysis and then pushing the HMW xylan out from the fiber cell wall by compressing.

The present method improves at least one of xylan yield, lignin yield and cellulose yield, and decreases wood consumption, cooking time, and the amount of water in the lignin containing fraction. These effects have advantages in lower energy consumption in evaporation. Further, the present method makes it possible to recover high value products HMW xylan and HMW lignin during pulping.

According to a second aspect is provided a HMW xylan fraction obtainable using the present method.

As shown in the examples, compared to prior art cooking processes, the present methods provide xylan with higher molecular weight, higher xylan yield and higher xylan concentration in the HMW xylan fraction.

According to a third aspect is provided a HMW lignin fraction obtainable using the present methods.

With the present methods a HMW lignin fraction can be obtained with a better lignin yield and higher consistency. The HMW lignin also has increased molecular weight compared to the one produced according to prior processes, such as the one disclosed in PCT/FI2011/050651.

According to a fourth aspect is provided pulp obtainable by using the present method. The obtained pulps according the present methods may have higher brightness, and require less wet pressing and lower steam consumption in drying compared to pulps produced according prior art methods. The dissolving pulps may additionally have a lower hemicellulose content compared to conventionally produced pulps.

Embodiments of the present disclosure provide certain benefits. Depending on the embodiment, one or several of the following benefits may be achieved: decreased consumption of chemicals, water, cellulosic fiber source, and energy; improved yield of cellulose, increased molecular weight of xylan and lignin.

DETAILED DESCRIPTION

As used herein, the term "comprising" includes the broader meanings of "including", "containing", and "comprehending", as well as the narrower expressions "consisting of" and "consisting only of".

In an embodiment the process steps are carried out in the sequence identified in any aspect, embodiment or claim. In another embodiment any process step specified to be carried out to a product or intermediate obtained in a preceding process step is carried out directly to said product, i.e. without additional, optional or auxiliary processing steps that may chemically or physically alter the product between said two steps.

In an embodiment the wood based cellulosic raw material used in the present cooking method is in the form of chips, pin chips, shavings or saw dust or a combination thereof. Preferably wood chips are used, more preferably softwood or hardwood chips, such as chips of *eucalyptus*, pine or spruce. However, when using wood chips as the primary raw material, the raw material may contain smaller amount of e.g. pin chips and/or saw dust.

Unless otherwise indicated, all percentage values refer to dry weight-%.

The present process is suitable for use in a plant or a mill, i.e. in industrial (large) scale processes.

Figure 1:
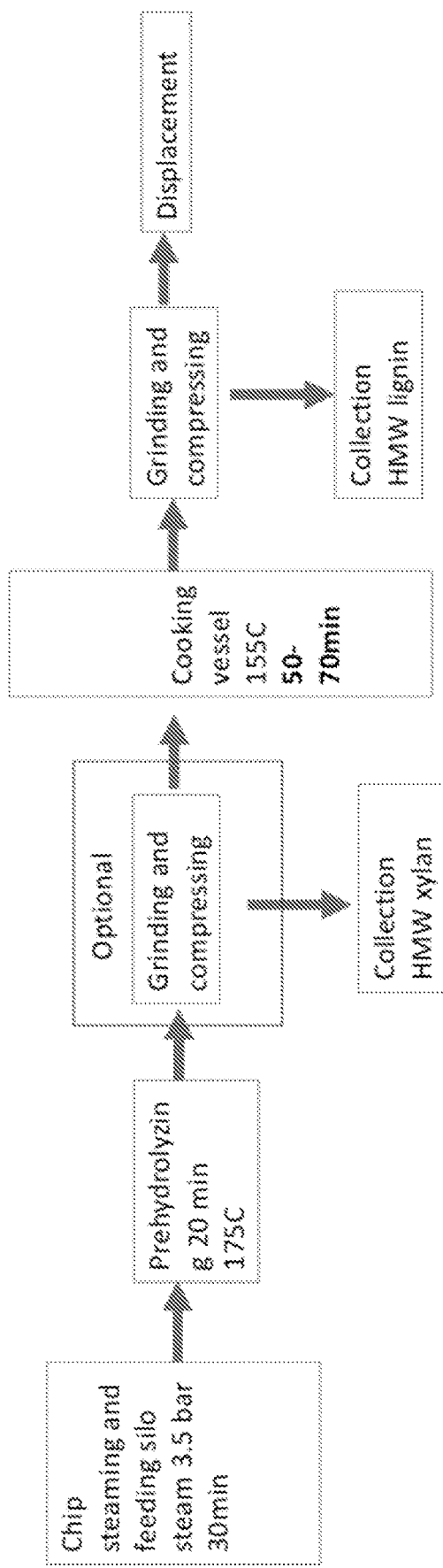
FIG. 1 schematically illustrates an embodiment of the present cooking method involving pre-steaming and pre-hydrolyzing of the wood based cellulosic raw material and a digester system for grinding and/or compressing condensate liquors out of wood chips after pre-hydrolysis. The process parameters mentioned in FIG. 1 are exemplary only, and other process parameters can be used, as described in this disclosure.

Referring to FIG. 1, in an embodiment the pretreatment comprises chip steaming, which can be carried out in a silo by feeding steam, 3.5 bar 30 min. In an embodiment prehydrolyzing can be carried out for 20 min at 175° C. In an embodiment cooking can be carried out in a cooking liquor at 155° C. for 50-70 min.

Figure 2:
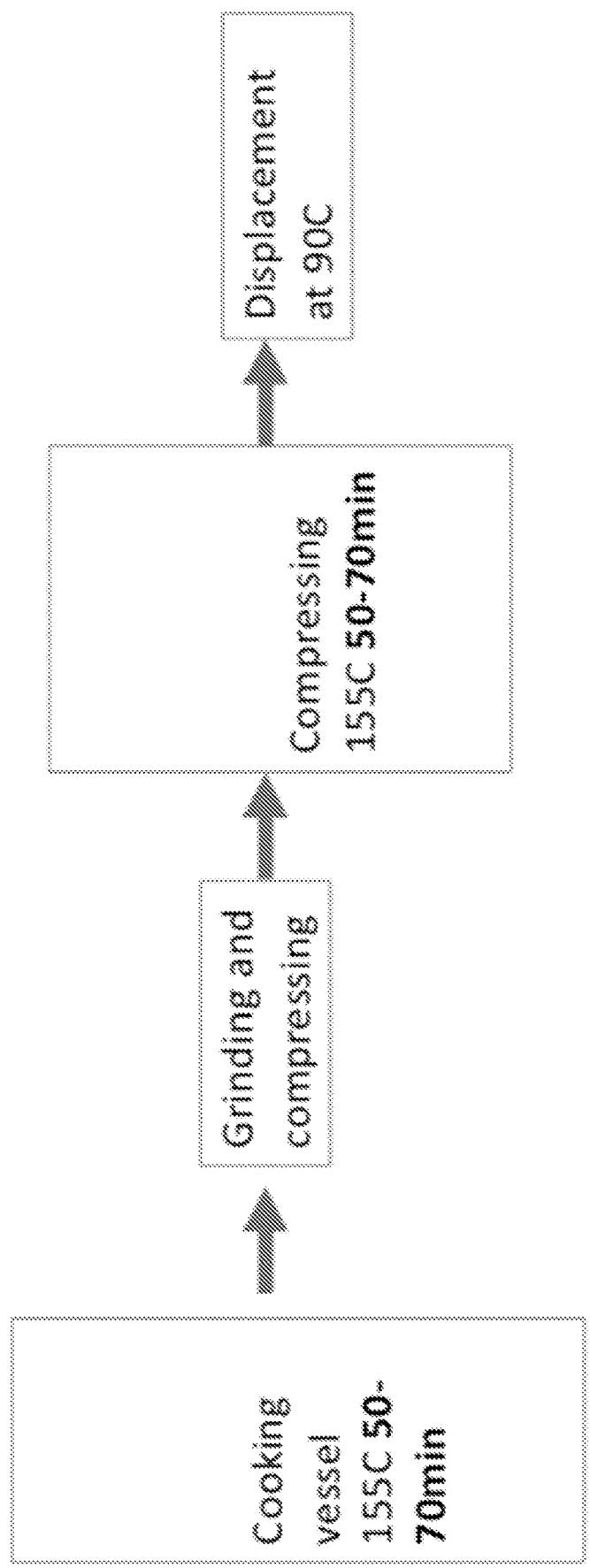
FIG. 2 schematically illustrates an embodiment of a digester system for compressing cooking liquors out of wood chips in pre-hydrolyzed kraft or soda cooking. The process parameters mentioned in FIG. 2 are exemplary only, and other process parameters can be used, as described in this disclosure.

Referring to FIG. 2, in an embodiment the cooking is carried out for 50-70 min in a cooking vessel operated at 155° C., the compressing is carried out at 155° C. for 50-70 min, and the displacement is carried out at 90° C.

Figure 3:
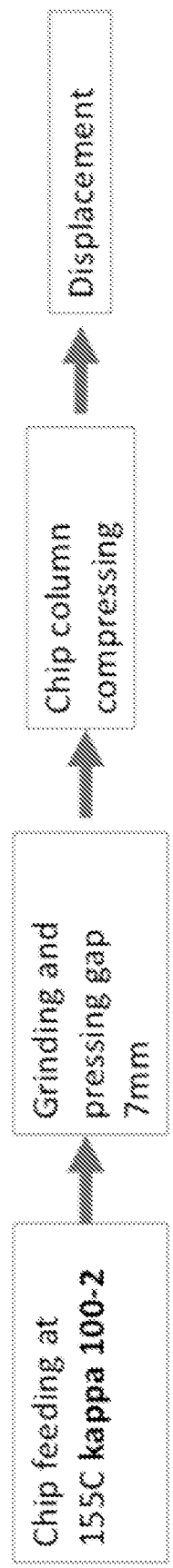
FIG. 3 illustrates an embodiment of a schematic process to compress the wood chips to press out the cooking liquors. The process parameters mentioned in FIG. 3 are exemplary only, and other process parameters can be used, as described in this disclosure.

Referring to FIG. 3, in an embodiment chips from a cooking step are fed at 155° C. and at a kappa value of 100-2 to a grinding and pressing step, wherein they are taken through a gap of 7 mm.

Figure 4:
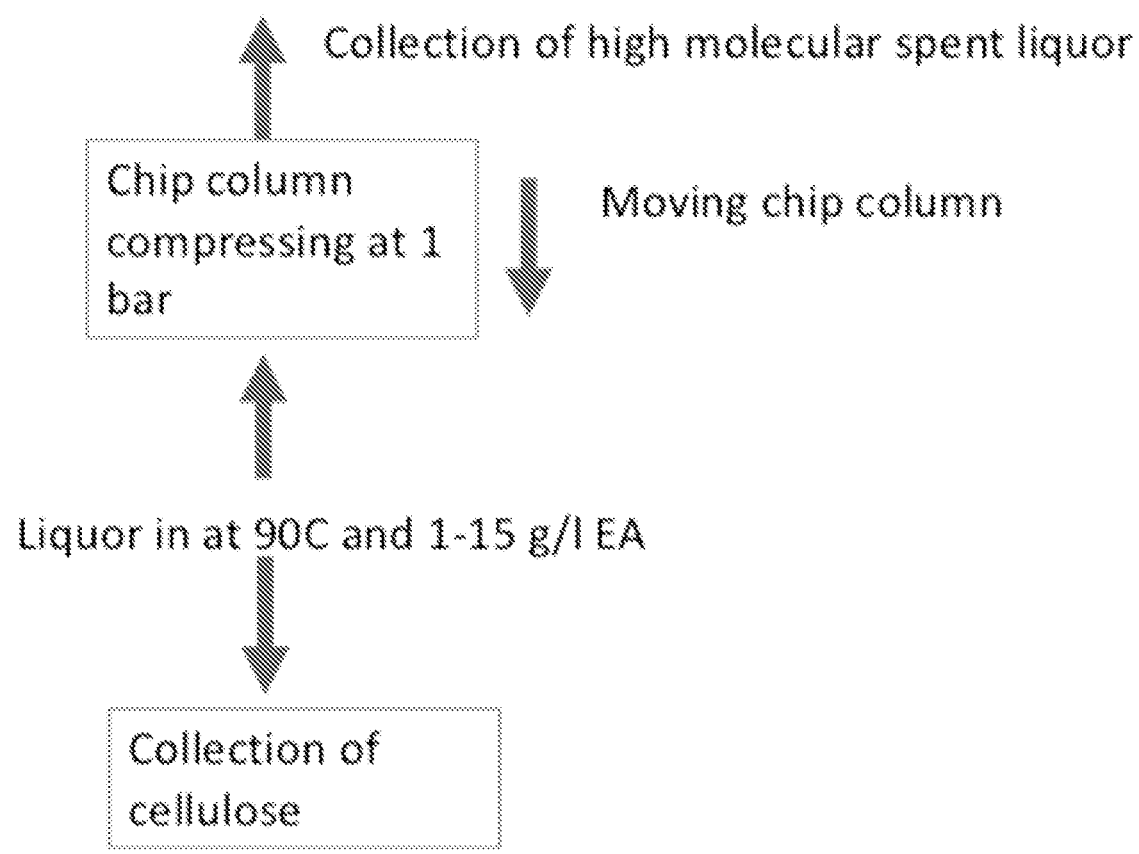
FIG. 4 schematically represents an embodiment of a displacing process for spent liquors from compressed wood chips. The process parameters mentioned in FIG. 4 are exemplary only, and other process parameters can be used, as described in this disclosure.

Referring to FIG. 4, in an embodiment the chip column is compressed at 1 bar in the presence of liquor at 90° C. containing 1-15 g/l effective alkali, which allow collection of high molecular weight spent liquor (containing HMW lignin) and cellulose.

In an embodiment the wood based cellulosic raw material has a xylan content of 4 weight-% or more.

The term high molecular weight xylan (HMW xylan) means xylan, which has an average weight molecular weight (MW) for hardwood and softwood of 45 000 g/mol or more.

The term high molecular weight lignin (HMW lignin) means lignin which has an average weight molecular weight (MW) of 4580 g/mol or more for hardwood, and 4980 g/mol or more for softwood.

In an embodiment molecular weight is measured by Size-Exclusion Chromatography and is presented as an average molecular weight (MW).

Hemicelluloses can be recovered in step d from the hydrolysate.

According to an embodiment pre-treatment by steaming is preferably carried out to achieve evacuation of the air inside the wood chips in order to improve liquor penetration to the porous wood material. Pre-steaming can be carried out in a separate steaming vessel or in a chips silo. The steaming can be carried out by using low pressure steam with an approximate pressure of 3.5 bar for at least 10 min, preferably for more than 20 min. In an embodiment the pre-steaming comprises pre-steaming with a low pressure steam at 1-4 bar for 1-100 min to provide pre-treated material.

Temperature used in the pre-treatment is preferably selected from the range 80-120° C., more preferably from the range 100-120° C., and even more preferably form the range 110-120° C.

In an embodiment the pre-hydrolysis is carried out by steam or water at a temperature selected from the range 150-220° C. In an embodiment the pre-hydrolyzing step comprises pre-hydrolyzing with steam at 8-15 bar at a temperature selected from the range 150-220° C. for 1 to 150 min.

Wood chips typically have a generally rectangular shape with a height, length, and width. However, the geometry of a wood chip may vary depending e.g. on its manufacturing process. The length (longest dimension) and width (second longest dimension) of a chip can be considered to determine the general "flat side" of a chip, and the thickness is the smallest dimension of the chip. For pin chips the width and thickness can be close to each other, thereby forming a match-like elongated object. The exact dimensions of the chip may vary.

In an embodiment the cellulosic raw material serving as a fiber source of the wood based cellulosic raw material comprises or consists of wood chips, and the grinding and compressing is applied to the largest area of surface of the wood chip. Preferably the grinding and compressing is carried out to achieve a density between 250-2000 kg/m$^3$, preferably between 350-1525 kg/m$^3$, to release HMW xylan and/or HMW lignin. Grinding and compressing to the largest area of surface can be achieved by using a gap which allows the chips to enter their smallest dimension, or "a side" first.

Equipment used for this purpose can be between segmented plates, feeding screws with blades with decreasing distance, plug feeding screws feeding against rotating segment plates, rotors and stators with segmented plates, modified pump where the stator and the rotor of the pump have segmented plates enabling pressing and feeding action, drum presses with gap and segmented surfaces, modified stator and rotor systems. The solutions are not limited to above mentioned and can be applied by person skilled in the art.

In a preferable embodiment the chips are forced to enter the gap such that their flat side with the largest surface area does not enter the gap first. This can be achieved by directing the chip to a gap to which the chip does not fit its flat side ahead.

In an embodiment grinding and compressing is carried out by taking the material through the gap in the cooking conditions to release HMW lignin into the spent liquor, thereby providing a HMW lignin fraction in black liquor.

In an embodiment the conditions of a preceding step, such as the optional pre-hydrolyzing step or the cooking step, are maintained when taking the material in the following step through the gap e.g. to release xylan or lignin.

In an embodiment the grinding and compressing is carried out to consistency of more than 10%, preferably more than 20% or more preferably more than 30%, preferably more than 65%. Consistency can be measured using standard TAPPI T 240 Consistency (Concentration) of Pulp Suspensions or corresponding ISO 4119 standard.

In an embodiment the method comprises the steps c) and d), and grinding and compressing in step d) is carried out at the pre-hydrolyzing temperature used in step c), and to a consistency of at least 10% by weight.

In an embodiment the grinding and compressing is carried out by taking the wood chips through a gap in the range 50 mm-8 mm, so that wood porosity decreases inside the gap at least 20%, 30%, 40%, 50%, 60%, 70% or more, and HMW lignin is released.

Correspondingly, HMW xylan can be released when the method comprises the optional pre-hydrolyzing step and the optional grinding and compressing step following directly said pre-hydrolyzing step.

In an embodiment the grinding and compressing is carried out by taking the pin chips through a gap in the range 35 mm-6 mm, so that wood porosity decreases inside the gap at least 20%, 30%, 40%, 50%, 60%, 70% or more, and HMW lignin is released. Correspondingly, HMW xylan can be released when the method comprises the optional pre-hydrolyzing step and the optional grinding and compressing step following directly said pre-hydrolyzing step.

In an embodiment the grinding and compressing is carried out by taking the saw dust through a gap in the range 20 mm-4 mm, so that wood porosity decreases inside the gap at least 20%, 30%, 40%, 50% 60%, 70% or more, and HMW lignin is released. Correspondingly, HMW xylan can be released when the method comprises the optional pre-hydrolyzing step and the optional grinding and compressing step following directly said pre-hydrolyzing step.

Ina n embodiment the grinding and compressing is carried out by pressing the pre-hydrolysed material and/or the cooked cellulosic material through a gap, and a size of the gap is selected such that:

for wood chips the gap is selected from the range 50 mm-8 mm, for pin chips the gap is selected from the range 35 mm-6 mm, and for saw dust the gap is selected from the range 20 mm-4 mm.

The wood material porosity is calculated by 1-amount wood inside the gap (kg/m$^3$)/1500 kg/m$^3$.

The term black liquor in the present invention means: used cooking liquor, i.e. spent liquor or spent cooking liquor.

In an embodiment the black liquor, or the spent liquor, is displaced with a displacing liquor containing 1-40% effective alkali as NaOH or NaOH cooking liquor, or an organic acid selected from lactic acid, acetic acid, formic acid, citric acid, oxalic acid, uric acid and malic acid. The displacing liquor thus displaces, or changes, the black liquor (spent cooking liquor) and, after the displacement step the cooked and compressed cellulose containing material (cellulosic fraction from which HMW xylan and HMW lignin have been removed in previous steps) remains in the displacing liquor.

In an embodiment HMW lignin is recovered from the HMW lignin fraction in spent liquor and from the displacing liquor. The recovery can be done for example by evaporating the water in the black liquor and recovering the lignin.

When HMW xylan is pressed out of the cell walls, a liquid with HMW xylan fraction and a solid fraction comprising compressed material are formed.

In an embodiment grinding and compressing is started in step d) before the wood chip has reached a porosity level of 0.66-0.9, preferably 0.67-0.9, more preferably 0.7-0.85.

Porosity level can be calculated as 1−(mass of dry material/density of cellulose (1500 kg/m$^3$).

In an embodiment the method comprises the steps c) and d), and the compression in the step d) is carried out to a density selected from the range between 350 kg/m$^3$ and 2000 kg/m$^3$, preferably between 350 kg/m$^3$ and 1525 kg/m$^3$.

In an embodiment the cooking method comprises the pre-hydrolyzing step c) and the grinding and compressing step d).

In an embodiment the neutralization in step e) is carried out using white liquor with sulfidity between 1-45% or sodium hydroxide or an organic acid selected from lactic acid, acetic acid, formic acid, citric acid, oxalic acid, uric acid and malic acid.

In an embodiment steps d) and g) are carried out to increase porosity of the fiber cell wall.

Total alkali, active alkali, and effective alkali means the measurement of soda, white and green liquors by standard method SCAN-N 30:85 or corresponding TAPPI or ISO standards.

In an embodiment the neutralizing is carried out using alkaline liquor containing 1-45 effective alkali as NaOH with sulphidity of 1-45%, NaOH liquor (determined by method SCAN-N 30:85 or corresponding TAPPI or ISO standards), or with an organic acid selected from lactic acid, acetic acid, formic acid, citric acid, oxalic acid, uric acid and malic acid. When using organic acids, the chemical charge can be selected from the range 1-100 g/kg organic acid. The chemical charge is calculated from the initial dry wood material mass (kg) as mass of the chemical of choice. The relation of the cooking liquor and biomaterial and can be selected from 2-10 as mass (kg).

In an embodiment neutralizing is carried out using sodium hydroxide with sulphidity.

In an embodiment neutralizing is carried out using NaOH liquor.

In an embodiment the neutralizing liquor contains 1-45% effective alkali as NaOH with sulphidity of 1-45%, NaOH cooking liquor, or an organic acid selected from lactic acid, acetic acid, formic acid, citric acid, oxalic acid, uric acid and malic acid, to provide cooked cellulosic material in spent liquor. The chemical charge is calculated from the initial dry wood material mass (kg) as mass of the chemical of choice.

The mass ratio of the neutralizing liquor to the wood based cellulosic material be selected from the range 2-10 as dry mass of the wood based cellulosic material.

In an embodiment the hydrolysate with HMW xylan is recovered and followed by neutralization. In these conditions the current invention is able to press out xylan from the cell wall and maintain the xylan undegraded because most of the xylan is removed before entering high alkali concentration in the neutralization step.

In an embodiment neutralization is carried out at a temperature of at least 120° C., preferably more than 150° C., or more preferably more than 170° C.

The weight-% refers to a dry weight, such as a dry weight of wood of the wood-based cellulosic raw material.

The HMW xylan of the present invention can be collected directly after pre-hydrolysation as xylan does not become in contact with alkali used in the cooking phase. Xylan yield and molecular weight is thus maximized. The hydrolysate can also be displaced with neutralization liquor. However then part of the xylan is degradaded by alkali of the neutralization liquor and xylan yield is lower. In previous art PCT/FI2011/050651 pressing and shearing was started only after the lignin, hemicelluloses and cellulose reached their softness points after the cooking stage thereby resulting into chemically and physically different products.

According to an embodiment in the neutralization step an alkali charge of 10%, 15%, 20%, 25%, 30%, 35% or 70% w/w as effective alkali as NaOH or pure NaOH is used for neutralization. Preferably an alkali charge of about 20% w/w is used. In an embodiment the neutralization step is carried out by bringing the cellulosic material into contact with the neutralization liquor by pressing the liquor into the compressed material by a pump.

The term cooking liquor means white liquor, black liquor, white liquor and black liquor, soda, or mixtures of these, that are commonly used in chemical pulping during a cooking stage. White liquor comprises sodium hydroxide and sodium sulfide in water and is a strongly alkaline solution having a white opaque color. White liquor may contain minor amounts of sodium carbonate, sodium sulfate, sodium thiosulfate, sodium chloride, calcium carbonate and other accumulated salts. Soda comprises sodium hydroxide and traces of compounds contained in wood.

In an embodiment the cooking is carried out in alkaline cooking liquor containing 1-45% effective alkali as NaOH with sulphidity of 1-45%, with NaOH or with an organic acid selected from lactic acid, acetic acid, formic acid, citric acid, oxalic acid, uric acid and malic acid, to provide cooked cellulosic material in spent liquor.

The mass ratio of the cooking liquor to the wood based cellulosic material be selected from the range 2-10 as dry mass of the raw material.

According to an embodiment the cooking is carried out at a temperature of at least 120° C., preferably more than 150° C., more preferably more than 170° C. in the cooking liquor.

During cooking at least 5 wt-% dry wood raw material is used, such as 5-10 wt-%, and preferably more than 10 wt-%.

During cooking more than 10 wt-% cooking liquor, based on the total weight, is used.

The cooked cellulosic material in the cooking liquor may have an alpha cellulose content of more than 60 w-%, preferably more than 70 w-% and even more preferably more than 80 w-%.

According to an embodiment the cooking is continued until the final kappa number is reached, followed by compression and/or grinding through a gap with wood chips between 50 mm to 8 mm, or with pin chips between 35 mm to 6 mm and saw dust 20 mm 4 mm.

Kappa number can be selected between 120 and 1 in the cooking step. More specifically for dissolving pulps the desired kappa number can be selected between 1-15 and for paper grade pulps kappa number can be between 15-50. The cooking temperature selected from a range between 120° C. and 180° C. Temperature can be selected by person skilled in the art depending on the kappa number objective.

In an embodiment cooking is continued until a kappa number selected between 100 and 1 is reached when manufacturing pulp for dissolving pulp.

In an embodiment cooking is continued until a kappa number selected between 50 and 15 is reached when manufacturing paper grade pulp.

In an embodiment the method comprises the steps c) and d), and the grinding and compressing in step d) is carried out to a consistency of at least 60% by weight.

In an embodiment the cooking in step f) is continued to a kappa number selected from the range between 100 and 3, at a cooking temperature selected from the range between 120 and 180° C.

According to an embodiment in step g) grinding and compressing of wood chips is done as described above by forcing the wood chips through a gap at the conditions of the cooking step and to release HMW lignin into the cooking liquor, thereby forming a liquid HMW lignin fraction, and a solid fraction comprising compressed material.

In an embodiment grinding and compression in step g) can be started before the wood chip has reached a porosity level of 0.65-0.9, preferably 0.66-0.9, more preferably 0.7-0.85.

The compressed cellulose fraction has alpha cellulose content more than 85%, more preferably more than 90%, and more preferably more than 95%.

In an embodiment the cooked cellulosic material is compressed in the black liquor with a pressure selected from the range between 1 and 250 kPa to form a column of solids having a consistency of at least 5% by weight. Non-limiting examples of suitable pressures to reach the selected target consistency value are 1 kPa, 2 kPa, 3 kPa, 4 kPa, 5 kPa, 6 kPa, 7 kPa, 8 kPa, 9 kPa, 10 kPa, 20 kPa, 30 kPa, 40 kPa, 50 kPa, 60 kPa, 70 kPa, 80 kPa, 90 kPa, 100 kPa, 110 kPa, 120 kPa, 130 kPa, 140 kPa, 150 kPa, 160 kPa, 170 kPa, 180 kPa, 190 kPa, 200 kPa, 210 kPa, 220 kPa, 230 kPa, 240 kPa, and 250 kPa. Non-limiting examples of suitable consistency values are 5%, 6%, 7%, 8%, 9%, 10%, 15%, 20%, 25%, 30%, 35%, 40%, 45%, 50%, 5-50%, 5-40% 5-30% and 5-20% by weight.

In step h) the black liquor is preferably displaced with a displacing liquor having a lignin content lower than in the black liquor. The compressed column of the material at the end of step g) can be displaced by diluting to a consistency selected from the range between 2 and 35% by weight, such as 2%, 3%, 4%, 5%, 6%, 7%, 8%, 9%, 10%, 15%, 20%, 25%, 30%, 35%, 2-30%, 2-25%, 2-20%, 2-10% or 2-5% by weight.

In an embodiment in step i) the HMW lignin fraction is recovered both from the black liquor and from the displacing liquor.

In an embodiment in step j) the cellulose fraction or dissolving pulp is recovered.

In an embodiment step g) is carried out at the cooking temperature used in the step f), and to a consistency of at least 10% by weight.

In an embodiment the method comprises the steps c) and d), and in the step d) the compressive pressure is selected from the range between 35 kPa and 1000 kPa.

In an embodiment the step g) comprises pressing with a pressure selected from the range between 1 kPa and 250 kPa to form a column having a consistency of at least 5% by weight, and wherein the displacing step h) is carried out by displacing the black liquor with a second displacing liquor which has a lower lignin content than that in the black liquor.

In an embodiment the displacement liquor has an alkali charge selected from the range between 1% and 40% as per dry weight of cellulose material as effective alkali, or sodium hydroxide or an organic acid selected from lactic acid, acetic acid, formic acid, citric acid, oxalic acid, uric acid and malic acid.

In an embodiment the displacement step h) is carried out at a temperature selected from the range between 70° C. and 200° C.

In an embodiment after step j) the dissolving pulp is dewatered to remove 90% or more of the alkali, lignin and dissolved xylan and other organic and inorganic material as a liquor flow from the pulp and to provide dewatered pulp.

In an embodiment the method comprises delignifying the dewatered pulp by oxygen to provide delignified pulp, optionally followed by washing and pressing.

In the embodiment at least a HMW lignin fraction and at least a HMW xylan fraction are recovered from the spent liquor and from the second displacing liquor. Optionally a lignin fraction and/or xylan fraction containing smaller molecular weight species is also recovered.

The present method improves xylan yield, lignin yield and cellulose yield and decreases wood consumption, cooking time and increases the amount of liquor in lignin and xylan recovered.

EXAMPLES

The effects obtainable by embodiments of the method of invention are demonstrated by the following experiments, which should not be considered as limiting the scope of the invention. The abbreviation REF refers to prior art methods, i.e. cooking method without compressing step according to the present invention. The cooking conditions can be selected by the person skilled in the art to get the target kappa number at the end of the cooking stage.

Example 1

In this example increase of xylan molecular weight was observed when carrying out the method according to the present invention involving a pre-hydrolysis step and a grinding and compressing step. *Eucalyptus* chip and pine wood chips were processed both according to present method and according to a reference method (REF), i.e. as presented in EP0442806A1. Wood chips were pre-treated to remove air from the chips by steam at 115° C. for 5 min. The pre-hydrolysis was done with water at 175° C. for 25 min.

After that the chips were fed through narrow gap with rotor grinding and compressing against the pressure vessel wall, followed by compressing the hydrolysate from the raw material source, so that the material consistency was more than 65%. HMW xylan was recovered from the hydrolysate. Then the pre-hydrolyzed raw material was neutralized with alkali having in the soda cooking effective alkali charge as NaOH 6 mol/kg and sulphidity of 28% in the pre-hydrolyzed kraft cooking. The temperature was 150° C. Neutralization time was 17 min, after which neutralization liquor was displaced with cooking liquor by using a cooking liquor to wood ratio of 4. The effective alkali charge as NaOH 2.5 mol/kg and sulphidity of 28% in the pre-hydrolyzed kraft cooking.

Cooking temperature was 156° C. and after cooking at H-factor of 25 the chips were fed through narrow gap where rotor grinding and compressing against the pressure vessel wall causing grinding and compressing and the HWM lignin containing spent liquor was displaced with washing filtrate. The cooking results are presented the table 1 for pre-hydrolysis soda and pre-hydrolysis kraft cooking.

TABLE 1

| Sample | Kappa number | Xylan, average Mw, g/mol | Cooking time decrease, min | Cooking, yield | Lignin, average Mw, g/mol |
|---|---|---|---|---|---|
| REF Kraft Eucalyptus | 9.5 | 27000 | — | 40.5 | 2300 |
| REF Kraft Pine | 10.1 | 26400 | — | 38.2 | 4500 |
| Soda Eucalyptus | 8.2 | 72000 | 60 | 40.8 | 5500 |
| Soda Pine | 9.5 | 62000 | 55 | 39.1 | 6100 |
| Kraft Eucalyptus | 6.3 | 78000 | 70 | 41.2 | 6120 |
| Kraft Pine | 7.5 | 67000 | 75 | 39.9 | 6800 |

According to table 1, xylan and lignin Mw molecular weight increases, and cooking time decreases when cooking is done according to the present invention.

Example 2

In this example is presented Xylan yield and consistency obtained by using the present invention, and compared to a previous cooking method. In the samples, the wood chips were ground and compressed through a gap between 50 mm to 8 mm after pre-hydrolysis with a pressure of 15 MPa and the hydrolysate was collected for xylan analysis. In previous art marked as REF, no grinding and compression was used.

TABLE 2

| Sample | Xylan yield, % from wood |
|---|---|
| REF Pre-hydrolysis Kraft Eucalyptus | 12% |
| REF Pre-hydrolysis Kraft Pine | 10% |
| Pre-hydrolysis soda Eucalyptus | 45% |
| Pre-hydrolysis Soda Pine | 35% |
| Pre-hydrolysis Kraft Eucalyptus | 51% |
| Pre-hydrolysis Kraft Pine | 38% |

According to table 2 Xylan yield (%) increases when cooking is done according to the present invention.

As the results confirm, the present method improves the yield and decreases cooking time from both raw materials and with different kappa values.

The foregoing description has provided, by way of non-limiting examples of particular implementations and embodiments of the invention, a full and informative description of the best mode presently contemplated by the inventor for carrying out the invention.

It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A cooking method comprising:
   a) providing wood based cellulosic raw material comprising chips, pin chips, shavings, saw dust, or a combination thereof;
   b) pre-treating the wood based cellulosic raw material by steaming to provide pre-treated material;
   c) pre-hydrolyzing the pre-treated material with steam or water to provide pre-hydrolyzed material;
   d) grinding and compressing the pre-hydrolyzed material to release the HMW xylan from the pre-hydrolyzed material into a hydrolysate, and recovering the hydrolysate with the HMW xylan;
   e) neutralizing with sodium hydroxide with sulphur or with sodium hydroxide, or displacing with an organic acid selected from lactic acid, acetic acid, formic acid, citric acid, oxalic acid, uric acid and malic acid;
   f) cooking in a cooking liquor comprising sodium hydroxide with sulphur or sodium hydroxide, or an organic acid selected from lactic acid, acetic acid, formic acid, citric acid, oxalic acid, uric acid and malic acid, to provide cooked cellulosic material in a spent liquor;
   g) grinding and compressing the cooked cellulosic material to release HMW lignin from the cooked material into the spent liquor, thereby providing a HMW lignin fraction in black liquor and a compressed cellulose fraction;
   h) displacing the black liquor with a displacing liquor containing 1-40% effective alkali as NaOH or acidic sulfite cooking liquor, or displacing with an organic acid selected from lactic acid, acetic acid, formic acid, citric acid, oxalic acid, uric acid and malic acid;
   i) recovering the HMW lignin from the HMW lignin fraction in black liquor and from the displacing liquor; and
   j) recovering dissolving pulp from the compressed cellulose fraction; and wherein the grinding and compressing in step d) is carried out at the pre-hydrolyzing temperature used in step c), and to a consistency of at least 10% by weight.

2. The method of claim 1 wherein the grinding and compressing in step d) is carried out to a consistency of at least 60% by weight.

3. The method of claim 1 wherein the grinding and compressing in the step d) is carried out to a density selected from the range between 350 kg/m$^3$ and 2000 kg/m$^3$.

4. The method of claim 1 wherein in the step d) a compressive pressure is selected from the range between 35 kPa and 1000 kPa.

5. The method of claim 1, wherein the cooking in step f) is continued to a kappa number selected from the range between 100 and 3, at a cooking temperature selected from the range between 120 and 180° C.

6. The method of claim 1, wherein the grinding and compressing of the pre-hydrolyzed material and the grinding and compressing of the cooked cellulosic material is carried out by pressing the pre-hydrolyzed material and/or the cooked cellulosic material through a gap, and a size of the gap is selected such that:
   for wood chips the gap is selected from the range 50 mm-8 mm,
   for pin chips the gap is selected from the range 35 mm-6 mm, and
   for saw dust the gap is selected from the range 20 mm-4 mm.

7. The method of claim 1, wherein step g) is carried out at the cooking temperature used in the step f), and to a consistency of at least 10% by weight.

8. The method of claim 1, wherein the neutralizing in step e) is carried out using white liquor with sulfidity between 1-45% or sodium hydroxide or an organic acid selected from lactic acid, acetic acid, formic acid, citric acid, oxalic acid, uric acid and malic acid.

9. The method of claim 1, wherein the step d) and the step g) are carried out to increase porosity of the fiber cell wall.

10. The method of claim 1, wherein the step g) comprises compressing with a pressure selected from the range between 1 kPa and 250 kPa to form a column having a consistency of at least 5% by weight, and wherein the displacing step h) is carried out by displacing the black liquor with a second displacing liquor which has a lower lignin content than that in the black liquor.

11. The method of claim 1, wherein the displacing in step h) is carried out at a temperature selected from the range between 70° C. and 200° C.

12. The method of claim 1, wherein after step j) the dissolving pulp is dewatered to remove 90% or more of the alkali, lignin and dissolved xylan and other organic and inorganic material as a liquor flow from the pulp and to provide dewatered pulp.

13. The method of claim 12 comprising delignifying the dewatered pulp by oxygen to provide delignified pulp, followed by washing and pressing.

14. A high molecular weight xylan fraction obtainable using the method of claim 1.

15. A high molecular weight lignin fraction obtainable using the method of claim 1.

16. Pulp obtainable using the method of claim 1.

* * * * *